Figure 1:
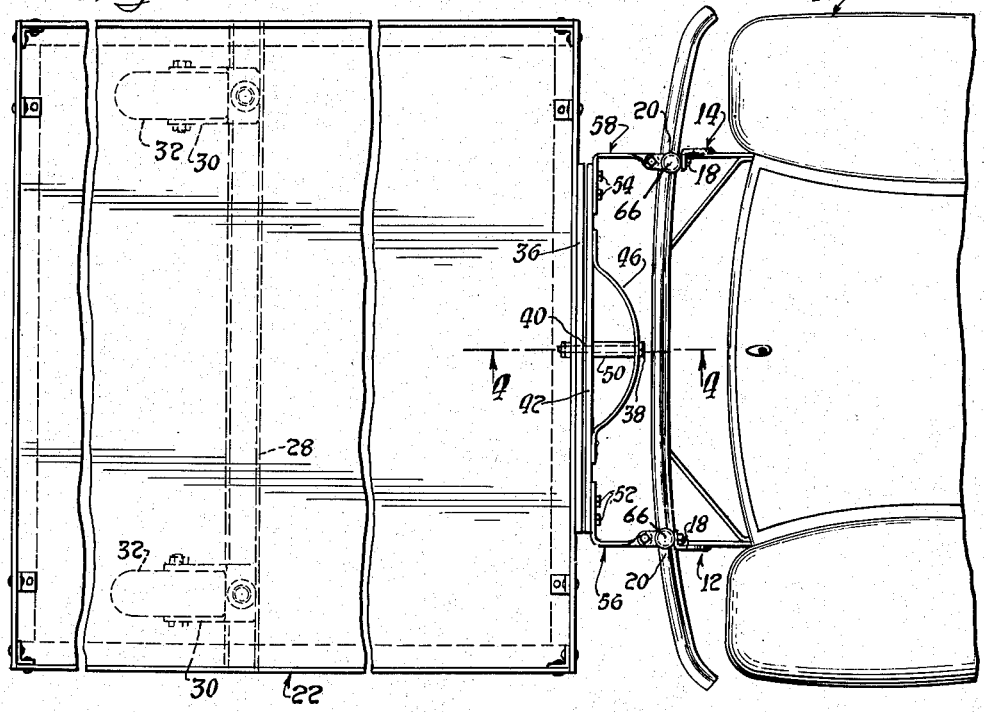

Feb. 17, 1953 G. BRATLIEN 2,628,846
TRAILER VEHICLE AND COUPLING THEREFOR
Filed April 26, 1950 2 SHEETS—SHEET 1

INVENTOR.
Gilbert Bratlien,
BY Wilfred E. Lawson
Attorney.

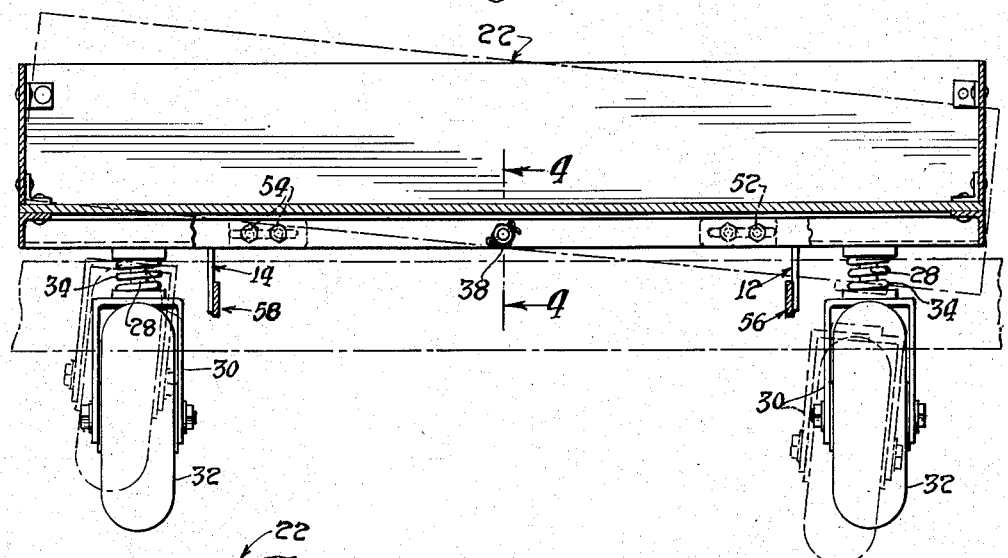
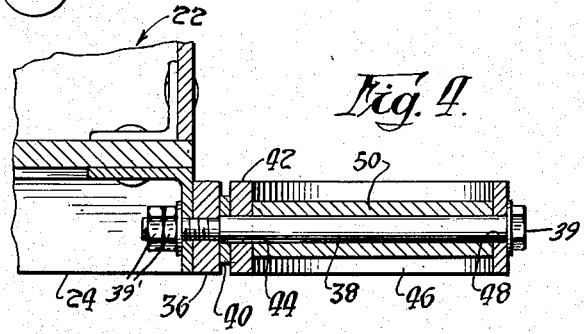
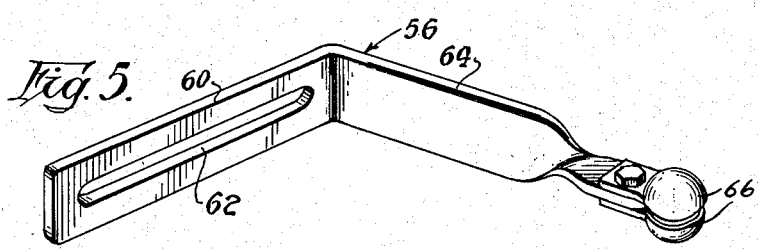

Patented Feb. 17, 1953

2,628,846

UNITED STATES PATENT OFFICE 2,628,846

TRAILER VEHICLE AND COUPLING THEREFOR

Gilbert Bratlien, El Monte, Calif.

Application April 26, 1950, Serial No. 158,310

3 Claims. (Cl. 280—33.4)

1

This invention relates to a trailer vehicle and coupling therefor and has for its primary object to prevent the "jackknifing" of the trailer vehicle when it is being backed by a traction vehicle.

Another object is to permit the trailing vehicle to be loaded without requiring careful distribution of the weight of the load and to distribute the weight between the wheels of the trailing vehicle and those of the traction vehicle when the trailing vehicle is properly loaded.

Among its features the invention embodies a trailing vehicle having a frame which is supported on caster wheels which are mounted on the frame to swing about spaced vertical axes, a bar pivotally connected to the trailer frame at one end thereof to swing about a horizontal axis which lies midway between the vertical axes, spaced parallel arms carried by bar on opposite sides of its pivotal connection with the trailer frame, and spaced parallel bracket arms fixed to a traction vehicle and projecting rearwardly therefrom, said arms being pivotally coupled to the bracket arms for movement about a horizontal axis that intersects the first mentioned horizontal axis.

Other features include longitudinal adjustability of the arms on the bar to facilitate the coupling of said arms to the bracket arms on the traction vehicle, a reinforcing bar on the frame of the trailing vehicle through the end of which the horizontal pivot pin extends, and an arched brace carried by the bar having an opening extending therethrough for the reception of the pivot pin.

Figure 2:
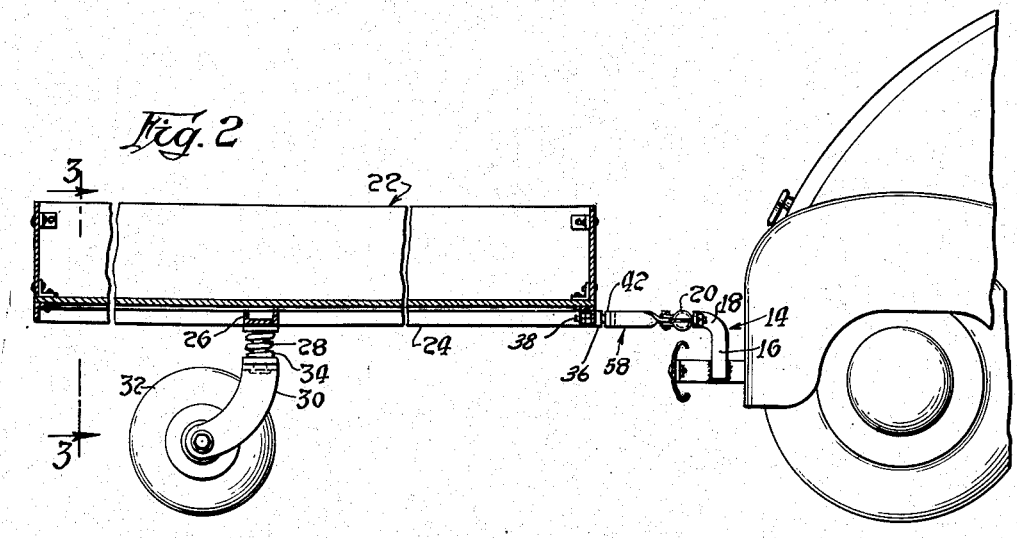

In the drawings:

Figure 1 is a top plan view of the rear end of the traction vehicle and of a trailing vehicle illustrating the features of this invention, Figure 2 is a side view partly in section of Figure 1, Figure 3 is an enlarged transverse sectional view taken substantially along the line of 3—3 of Figure 2, Figure 4 is a fragmentary enlarged sectional view taken substantially along the line 4—4 of Figure 1, and Figure 5 is a perspective view of one of the arms.

Referring to the drawings in detail a traction vehicle designated generally 10 has secured thereto as by welding a pair of bracket arms each designated generally 12 and 14 respectively. Each of these bracket arms comprises a vertical leg 16 and a horizontal leg 18 which extends beyond the rear end of the traction vehicle and is provided with a spherical coupling head 20 for co-

2 operation with a mating coupling member carried by the trailing vehicle.

A trailing vehicle designated generally 22 comprises a frame 24 to the under side of which is attached in any suitable manner a transversely extending channel member 26. Secured to the channel member 26 adjacent opposite ends are depending pivot pins 28 to the lower ends of which are coupled conventional curved forks 30 in which supporting wheels 32 are mounted to rotate. As illustrated the forks 30 swing about spaced vertical axes adjacent opposite sides of the trailing vehicle 22 and surrounding these pivot pins 28 between the channel member 26 and the yokes 30 are compression coil springs 34 which yieldingly support the trailing vehicle 22 on the wheels.

Fixed to one end of the frame 24 is a reinforcing bar 36, and extending through the frame and the reinforcing bar is an opening for the reception of the pivot pin 38 having the form of a bolt which has a head 39 and is nutted as at 39', the same extending horizontally in a fore and aft direction midway between the vertical axes about which the yokes swing. Carried on the pivot pin 38 on the side of the reinforcing bar 36 remote from the frame 24 is a thrust bearing 40.

Mounted for rocking movement on the pivot pin 38 adjacent the thrust bearing 40 is a bar 42 which is provided midway between opposite ends with an opening 44 through which the pivot pin 38 extends. Fixed to the side of the bar remote from the thrust bearing 40 is an arched brace member 46 having an opening 48 midway between opposite ends for the reception of the pivot pin 38 and surrounding the pivot 38 between the bar 42 and the brace member 46 is a spacing sleeve 50.

Coupled as by bolts or cap screws 52 and 54 to the bar 42 adjacent opposite ends thereof are arms designated respectively 56 and 58. These arms are of identical construction and each comprises an L-shaped body one leg 60 of which is provided with an elongated slot 62 through which the bolts 52 or 54 extend in order to adjustably hold their respective arms on the bar. The opposite leg 64 of each arm 56 and 58 projects perpendicularly from the leg 60 and extends from the side of the bar 42 remote from the trailer 22. Carried by legs 64 of the arms 56 and 58 are spherical cups 66 for the reception of the heads 20 by which the arms 56 and 58 are detachably connected respectively to the bracket arms 12 and 14.

In use with the trailer 22 coupled to the traction vehicle 10 as shown and described, it is evident that upon backing the trailer by the traction vehicle, the forks 30 will swing about their vertical axes and owing to the fact that the front end of the trailing vehicle is held against movement about a vertical axis, "jackknifing" of the trailing vehicle will be prevented. At the same time the swivel mounting of the wheels 32 of the trailing vehicle will enable it properly to track when being towed by the traction vehicle whether the traction vehicle is moving on a curve or a straightaway. The coupling elements however between the traction vehicle and the trailer will permit relative rocking of the trailer and traction vehicle so as to compensate for irregularities in the roadway and at the same time the springs 34 of the trailing vehicle will yieldingly suspend a load carried thereby and relieve it from road shocks. Moreover since the coupling pivots 20 lie along a horizontal axis which intersects the horizontal axis of the pivot pin 38, it will be evident that relative vertical movement between the traction and trailing vehicle may be had. It is evident that in loading the trailing vehicle, even though the major portion of the load lies between the wheels 32 and the wheels of the traction vehicle, no tipping or tilting of the trailing vehicle will occur, as the load will be equally distributed on the wheels above mentioned.

While in the foregoing there has been shown and described the preferred form of this invention, it is to be understood that minor changes in the details of construction, combination and arrangement of parts may be resorted to without departing from the spirit and scope of the invention as claimed.

I claim:

1. In a trailer of the type having a bed supporting frame and caster wheels carried by said frame below the level thereof to swing about spaced vertical axes, means for coupling said trailer to a traction vehicle comprising a bar mounted crosswise on the trailer frame at the front end thereof to turn about a horizontal axis that lies substantially midway between the spaced vertical axes, spaced L-shaped members having parallel arms projecting forwardly from the ends of said bar, spaced parallel bracket arms fixed to a traction vehicle at the rear end thereof, and means pivotally coupling the extremities of the first arms to those of the bracket arms for movement about a horizontal axis that intersects the first mentioned horizontal axis.

2. In a trailer of the type having a bed supporting frame and caster wheels carried by said frame below the level thereof to swing about spaced vertical axes, means for coupling said trailer to a traction vehicle comprising an elongated reinforcing bar secured against the front end of the trailer frame and centered between the sides thereof, a pivot pin carried centrally of and by the front end of said trailer frame and extending through the reinforcing bar, said pivot pin lying along a horizontal axis that lies midway between the spaced vertical axes, a second bar of a length equal to that of the first bar mounted on said pivot pin to rock about said horizontal axis, spaced L-shaped members having parallel arms projecting forwardly from the ends of said second bar, spaced parallel bracket arms fixed to a traction vehicle and projecting from the rear end thereof, and means pivotally coupling the extremities of the first arms to those of said bracket arms for rocking movement about an axis that intersects the horizontal axis.

3. In a trailer of the type having a bed supporting frame and caster wheels carried by said frame below the level thereof to swing about spaced vertical axes, means for coupling said trailer to a traction vehicle comprising a reinforcing bar fixed to the front end of the trailer frame midway between the sides thereof, a pivot pin carried by the front end of the trailer frame and extending through the reinforcing bar, said pivot pin lying along a horizontal axis that lies midway between the spaced vertical axes, a second bar centrally mounted on said pivot pin to rock about said horizontal axis, spaced parallel arms carried at the ends of the second bar and projecting forwardly therefrom, spaced parallel bracket arms fixed to a traction vehicle and projecting from the rear end thereof, means pivotally coupling the first arms to the bracket arms for rocking movement about an axis that intersects the horizontal axis, and an arched brace on the forward side of the second bar midway between the first arms, said arched brace having an opening therethrough to receive the pivot pin.

GILBERT BRATLIEN.

REFERENCES CITED

The following references are of record in the file of this patent:

UNITED STATES PATENTS

| Number | Name | Date |
|---|---|---|
| 1,234,788 | Milner | July 31, 1917 |
| 2,033,298 | Pribil | Mar. 10, 1936 |
| 2,179,586 | Carpenter | Nov. 14, 1939 |
| 2,198,270 | Maranville | Apr. 23, 1940 |